J. W. HEGELER & G. HOLMES.
POWER TRANSMISSION MECHANISM.
APPLICATION FILED APR. 18, 1912.
1,176,290.
Patented Mar. 21, 1916.
5 SHEETS—SHEET 3.
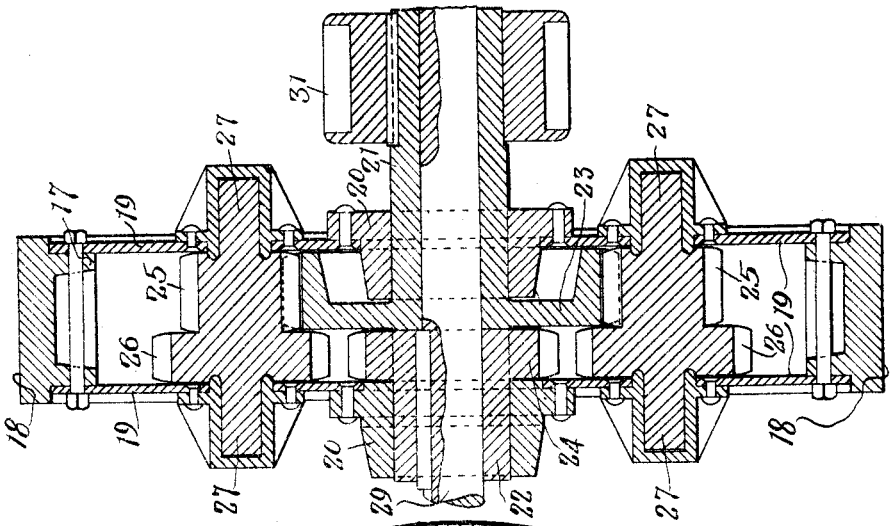
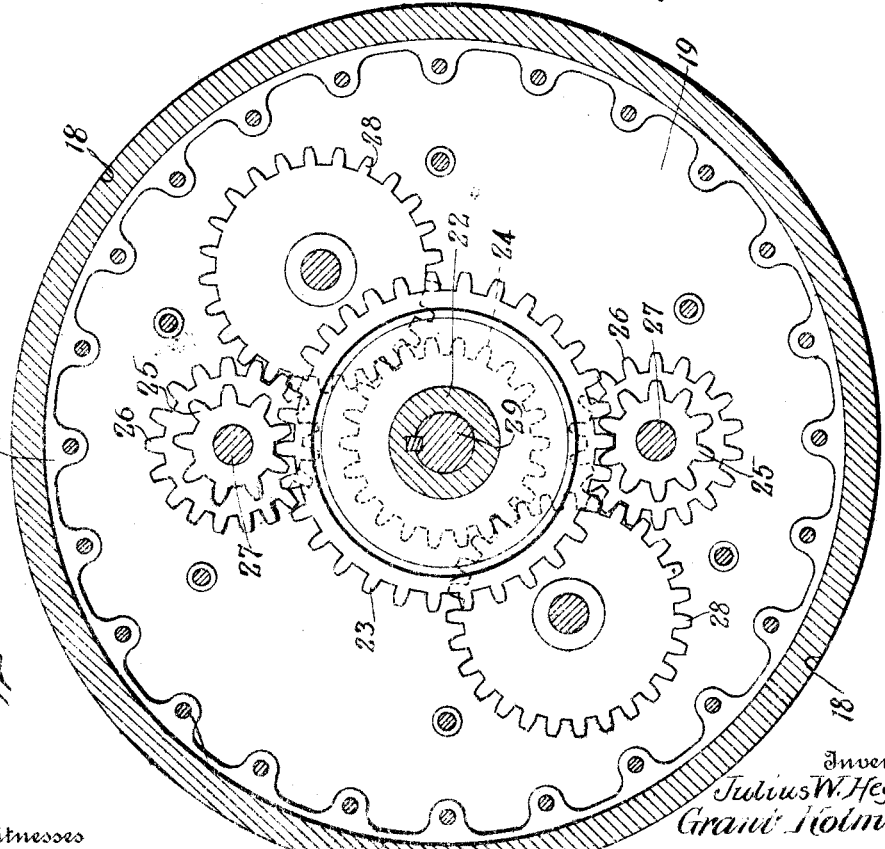
Witnesses
Howard Walmsley.
Harriet L. Hammaker.
Inventors
Julius W. Hegeler,
Grant Holmes,
By Toulmin & Reed.
Attorneys

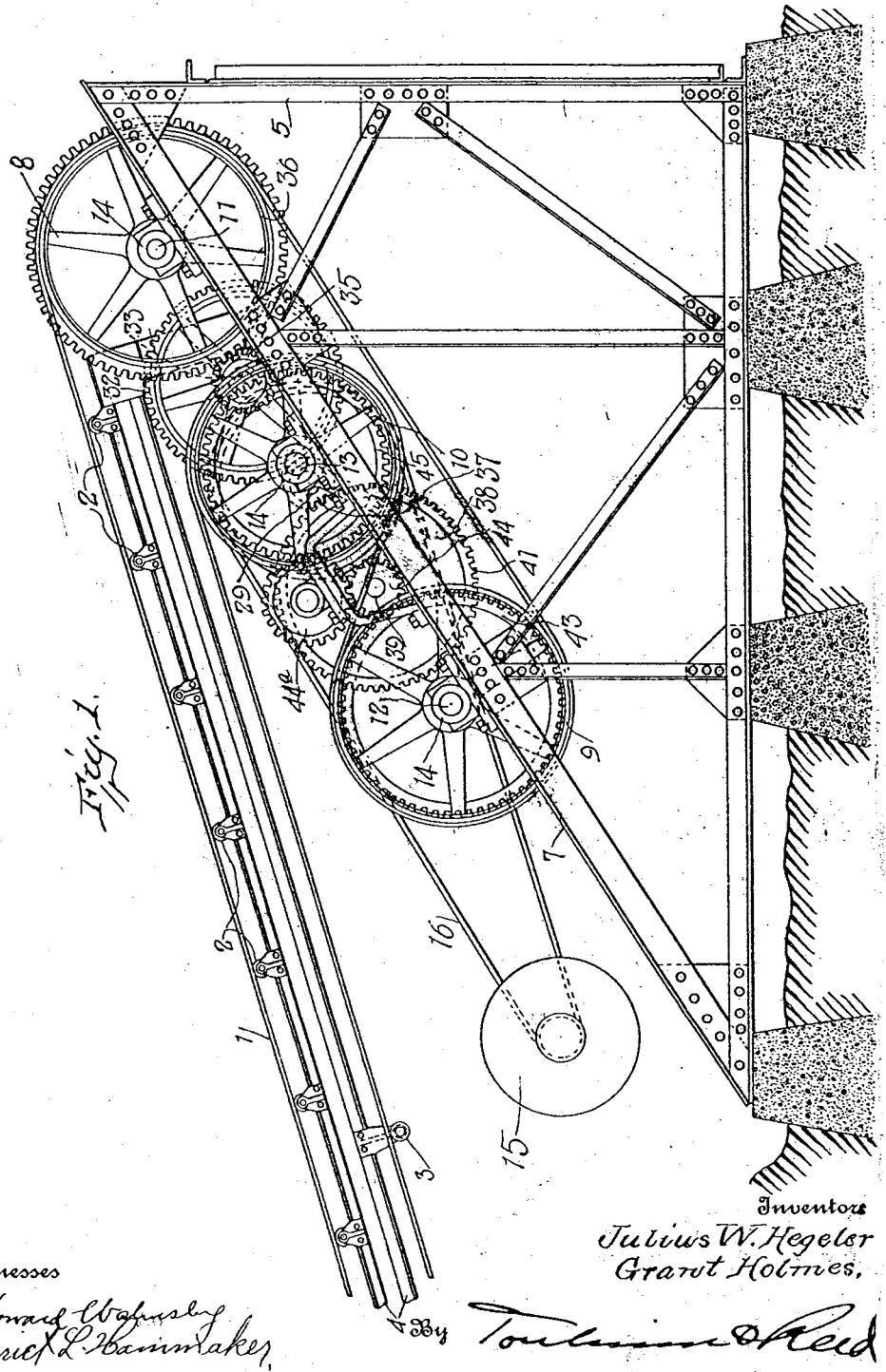

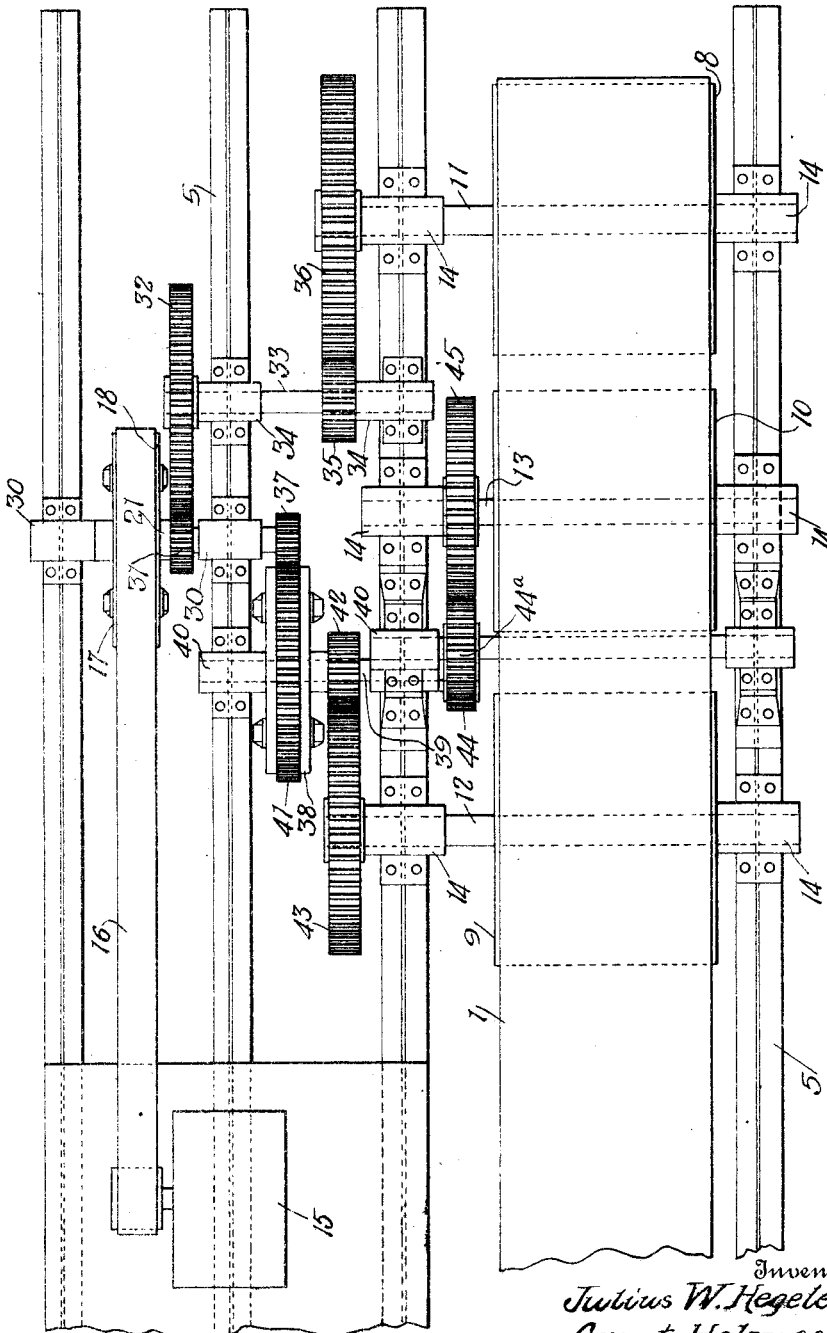

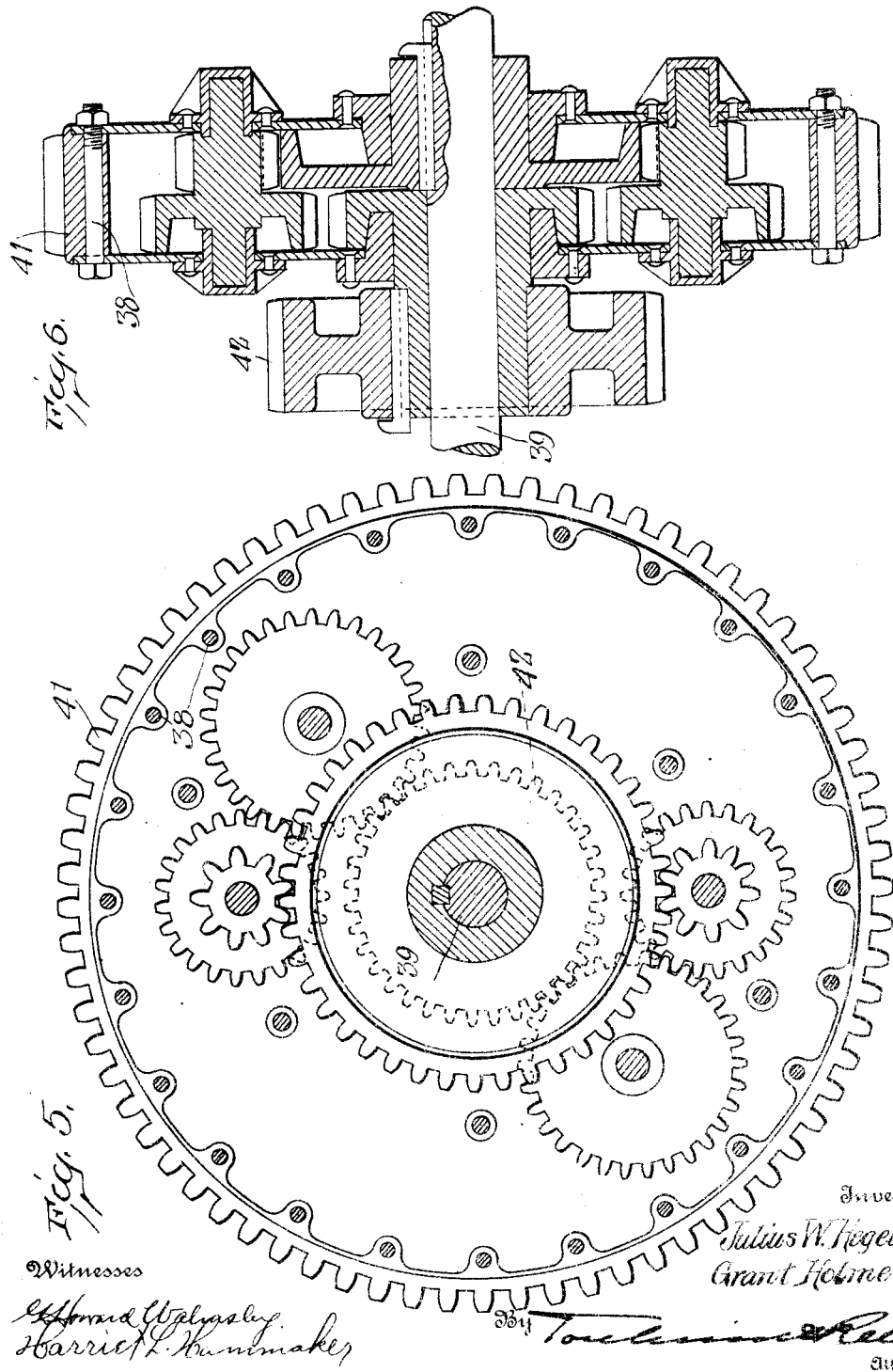

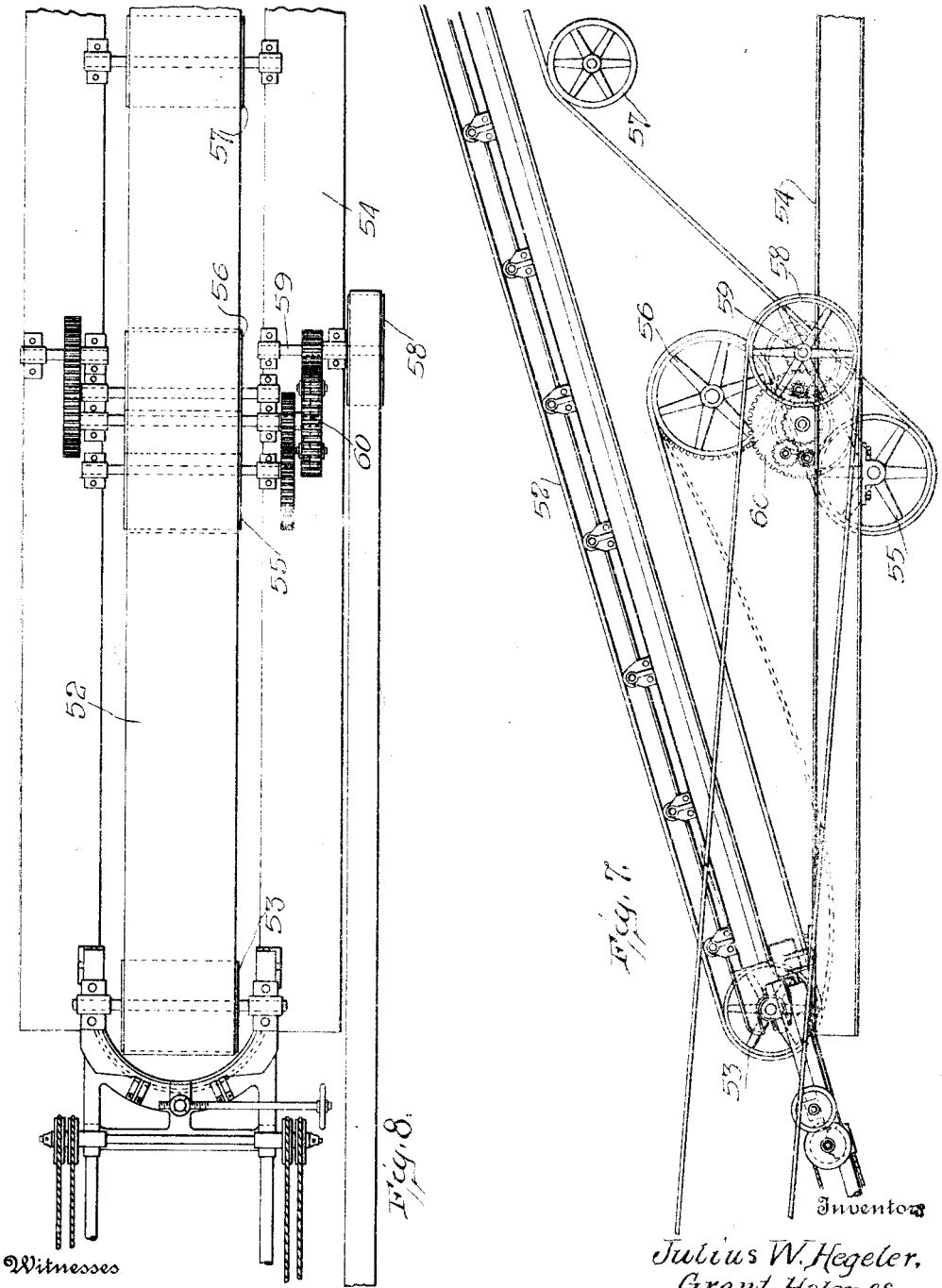

UNITED STATES PATENT OFFICE.

JULIUS W. HEGELER AND GRANT HOLMES, OF DANVILLE, ILLINOIS.

POWER-TRANSMISSION MECHANISM.

1,176,290. Specification of Letters Patent. Patented Mar. 21, 1916.

Application filed April 18, 1912. Serial No. 691,675.

*To all whom it may concern:*

Be it known that we, JULIUS W. HEGELER and GRANT HOLMES, citizens of the United States, residing at Danville, in the county of Vermilion and State of Illinois, have invented certain new and useful Improvements in Power-Transmission Mechanism, of which the following is a specification, reference being had therein to the accompanying drawing.

This invention relates to power transmission mechanism and more particularly to mechanism for transmitting power between belts, cables, chains or other endless flexible members and a plurality of sheaves or drums.

The device is especially adapted for use with endless belt conveyers.

In a multiple pulley drive mechanism the increasing tension to which the belt is subjected in passing over the successive pulleys, does, through the elasticity of the belt, slightly vary its speed at different points. This necessitates, in order that each pulley shall transmit power to the belt, a different peripheral speed for each of the pulleys.

In any series containing more than two drivers, the carrying surface of the belt comes in contact with one or more of the drivers. This will, especially if the material conveyed is at all sticky, result in building up the surfaces of those pulleys in contact with the carrying side of the belt, thereby altering the peripheries of such pulleys, and at constant rotative speed changing their peripheral speeds.

In a multiple pulley drive each driver should, in order that it may exert its maximum traction on the belt, be supplied with power in accordance with the amount of traction which the relative location of the driver in the series permits it to impart to the belt.

It is therefore one object of this invention to provide a driving mechanism which shall automatically compensate for the different working conditions of each of the drivers, running some faster and others slower, until the required relative peripheral speeds are secured.

It is also an object of this invention to divide the load among the several driving pulleys unequally but in proportion to the load which each can transmit and to provide for this purpose a suitable method of transmitting power to these pulleys from a common source.

In the accompanying drawings, in which this invention is shown in connection with an endless belt conveyer, Figure 1 is a side elevation of a head drive for a conveyer; Fig. 2 is a top plan view of the head drive; Fig. 3 is a vertical section of the compensating gearing used between the source of power and the driving pulleys; Fig. 4 is a similar view taken parallel to the axis thereof; Fig. 5 is a vertical section of the compensating gearing employed between the second and third driving pulleys taken transversely to the axis thereof; Fig. 6 is a similar view taken parallel to the axis; Fig. 7 is a side elevation of a heel drive showing the invention applied thereto; and Fig. 8 is a top plan view of the same.

In these drawings we have, for the purpose of illustration, shown the invention applied to a belt conveyer, both to a head drive and to a heel drive. In the former case there are three driving pulleys and in the latter case two, shown in the drawings. In both cases the conveyer is indicated as a flexible belt, smooth on both sides, but none of these conditions is essential to, or a limitation of the application of this device. It is manifest that a chain, cable or other endless flexible member driven by means of traction from a sheave or drum could be operated in a similar way by means of this device.

Referring to the head drive as illustrated in Figs 1 to 6, the conveyer belt 1 is supported on a series of rollers 2 and 3 mounted on a conveyer frame 4, the upper end of which is supported by a frame 5. The frame 5 has one side inclined as indicated at 7, to form a support for a plurality of driving pulleys, which in the present instance are three in number. These pulleys, which are indicated by the reference numerals 8, 9 and 10, are mounted, respectively, on shafts 11, 12 and 13, journaled in bearings 14 on the frame. In the particular arrangement here illustrated the uppermost pulley, 8, is mounted at the extreme upper end of the conveyer and is the first pulley to be engaged by the belt. The belt passes about the pulley 8, beneath the pulley 10, without engaging the same, and about the pulley 9, thence downward between the pulleys 9 and 10, about the pulley 10, thence above the pulley 9 and along the conveyer frame 4. In order that we may attain the objects above set forth power is applied to the several driving pulleys separately and in unequal quantities, thereby causing the upper pulley 8 to drive the largest portion of the load, the pulley 9 the next larger portion and the pulley 10 the smallest portion of the load. By so applying the power the successive pulleys are caused to tighten the belt about the preceding pulleys, that is, the pulley 10 will not only drive its share of the load, but, in so doing, will tighten the belt about the pulley 9, thereby giving the latter pulley the necessary amount of adhesion to enable it to drive its share of the load. Likewise, the pulley 9 will tighten the belt about the pulley 8 to give this pulley the proper adhesion to enable it to drive its share of the load. In the present instance the power for driving the several pulleys is derived from a single source, which is here indicated as a motor 15 connected by means of a belt 16 with a compensating pulley 17. This compensating pulley is of such a character as to divide the power into two unequal quantities, and, in the form here shown, has a smooth face or periphery 18 constituting the driving member for the gearing and connected by means of side members 19 with hubs 20 rotatably mounted on sleeves 21 and 22 which form the hubs of gears 23 and 24, respectively.

Two pairs of pinions 25 and 26 are mounted on shafts 27 arranged on opposite sides of the axis of the pulley 18. The smaller pinions 25 mesh directly with the larger gear 23, while the larger pinions, 26, are connected through intermediate pinions 28 with the smaller gear 24. The hub 22 of the gear 24 is keyed to a shaft 29 journaled in bearings 30 on the frame 5 and the hub 21 of the gear 23 extends beyond the adjacent side member of the gear and is provided on its outer end with a pinion 31. The ratio of the pinions and gears is such that the power applied to the driving member or pulley 18 is divided and transmitted in unequal quantities to the pinion 31 and to the shaft 29, the pinion 31 receiving the larger portion of the power. The pinion 31 meshes with a gear 32 carried by a shaft 33 journaled in bearings 34 on the frame 5 and having a pinion 35 which meshes with a gear 36 carried by the shaft 11 of the pulley 8, thus transmitting power to the driving pulley 8, and causing the same to drive its due proportion of the gross load. The power applied to the shaft 29 is transmitted through the medium of a pinion 37 to a compensating gearing 38 mounted on a shaft 39 carried by bearings 40 on the frame 5. This compensating gearing is similar in its main features of construction to the compensating pulley 17, differing therefrom in two respects only, the first being that its peripheral driving member is in the form of a gear instead of a pulley, and second, that the ratio of the internal gears is different from the ratio of the gears in the pulley 17. The larger portion of the power is transmitted from a quill pinion 42, corresponding to the pinion 31 of the gear 17, to a gear 43 carried by the shaft 12 of the lower driving pulley 9, while the smaller portion of the power is transmitted through a pinion 44 on the shaft 39 to a gear 45 on the shaft 13 of the pulley 10. Obviously, however, the ratio of the gears and the percentage of the load driven by the various driving pulleys can be varied at will.

The arrangement here described is a typical one and the ratio of the pulls determined by the sizes of the various gears and pinions preferably will be made such that under normal conditions the several drivers will slip on the belt at the same time. That is, when any one pulley is loaded to the maximum each other one of the series will also be loaded to its maximum. The compensating gearings not only divide the load among the several pulleys in correct proportion but they also constitute flexible connections between the several driving pulleys and between the driving pulleys and the source of power which will permit the mechanism to accommodate itself to any variation in the diameter of the driving pulleys due to the building up of the same or to any other cause. They also permit the peripheral speeds of the different pulleys to vary to compensate for stretch of the belt and for any deviation of natural peripheral speeds from the speeds actually required. While we have shown one form of compensating gearing it will, of course, be understood that any suitable type of compensating gearing, or any equivalent mechanism, may be employed.

In Figs. 7 and 8 we have shown one form of heel drive with our invention embodied therein. As here shown the belt is indicated at 52, and passes over a heel pulley 53, supported at the lower end of the conveyer and preferably provided with automatic means to adjust the same, and about a head pulley at the opposite end of the frame. This latter is not here shown, as it is of ordinary construction. The driving mechanism is supported on a suitable frame 54 a short distance from the heel of the conveyer and comprises, in the present instance, two driving pulleys 55 and 56. The belt as it comes from the head pulley passes over an idler or guide pulley 57, thence about the primary driving pulley 55 and then about the secondary driving pulley 56 and from the secondary driving pulley to the heel pulley 53. The arrangement of the two pulleys of the drive is such that the belt will be in contact with a relatively large portion of the surface of each of the pulleys. The pulleys are driven from any suitable source of power which, in the present instance, is applied to the pulleys by means of a belt pulley 58 mounted on a shaft 59 journaled on the frame 54. The power is transmitted from the shaft 59 to the pulleys through the medium of compensating gearing, as indicated at 60. The character of this compensating gearing and the manner of its connection with the shaft 59 and the driving pulleys 55 and 56 is similar to that above described in connection with the head drive. The compensating gearing will automatically adjust the speeds of the two pulleys to cause each to carry its proper share of the load and to exert the proper traction upon the belt. Further, when there is a tendency on the part of the secondary pulley 56 to slow up because of the placing of a load on the conveyer this slowing up of the one pulley will result in the acceleration of the primary pulley 55.

In the compensating gearing 18, the ratio of the gears determines the proportion of load which will be transmitted to the pinion 37 and to the gear 32, respectively, and these ratios are to be selected as nearly as may be to make the load on each proportionate to the maximum power which the respective pulleys are in position to transmit to the belt. The various driving pulleys may be of the same or of slightly different diameters; if the peripheral speeds of the pulleys have been selected so as exactly to compensate for the stretch of the belt, the pinions 25 and 26 will not rotate relatively to the outer casing when the device is in service, but will revolve with pulley 18 as if formed as an integral part thereof. If, however, belt tension or other conditions requires a variation of peripheral speed of the driving pulleys pinions 25—26 will rotate on their axes as well as revolve about the axis of 18, and by their rotation will transmit relatively different speeds to 37 and 32.

The operation of the invention as applied to both the head and the heel drives will readily be understood from the foregoing descriptions thereof and it will be apparent that the application of the compensating gearing to a multiple-pulley driving mechanism fully attains the several objects herein set forth.

While we have shown and described our invention as embodied in driving mechanism for a belt conveyer it will be understood that the invention is applicable to various power transmission mechanisms comprising an endless flexible member and sheaves or drums coöperating therewith and is not to be construed as limited to any particular kind of driving mechanism or to driving mechanism as distinguished from driven mechanism. We, therefore, wish it to be understood that we do not desire to be limited to the details of construction shown and described, for obvious modifications will occur to a person skilled in the art.

Having thus fully described our invention, what we claim as new and desire to secure by Letters Patent, is:—

1. The combination, with a plurality of driving pulleys mounted on parallel shafts, an endless flexible member adjusted to said pulleys, and a source of power, of means for transmitting power from said source of power to said pulleys, said means comprising compensating gearing interposed between said source of power and the respective shafts.

2. The combination, with an endless belt, a plurality of pulleys for the same, and a source of power, of a driving connection between said source of power and said pulleys comprising compensating gearing between said source of power and all of said pulleys and other compensating gearing between two of said pulleys.

3. The combination, with a plurality of driving pulleys, and an endless flexible member adjusted to said pulleys, of means for driving said pulleys, constructed and arranged for distributing the rotative effort unequally to said pulleys, and to permit said pulleys to rotate at different speeds and automatically to adjust the relative speeds of said pulleys so that each will develop its full designed efficiency.

4. The combination, with an endless flexible member, and a plurality of driving pulleys for the same, of power mechanism for driving said pulleys, and means to cause said power mechanism to exert different rotative efforts on different driving pulleys.

5. The combination, with an endless belt, a plurality of pulleys for the same, and a source of power, of a driving connection between said source of power and said pulleys, said connection comprising differential gearing between said source of power and all of said pulleys and other differential gearing between two of said pulleys.

6. The combination, with an endless belt, a plurality of pulleys for the same, and a source of power, of a driving connection between said source of power and said pulleys, said connection comprising differential compensating gearing between said source of power and all of said pulleys, and other differential compensating gearing between two of said pulleys.

7. The combination, with an endless belt, and a plurality of driving pulleys for the same, of power mechanism for driving said pulleys, and means to cause said power mechanism to exert different rotative efforts on different driving pulleys.

8. The combination, with a plurality of driving pulleys mounted on parallel shafts, an endless belt adjusted to said pulleys, and a source of power, of means for transmitting power unequally from said source of power to said pulleys, said means comprising differential compensating gearing interposed between said source of power and the respective shafts.

In testimony whereof, we affix our signatures in presence of two witnesses.

JULIUS W. HEGELER.
GRANT HOLMES.

Witnesses:
GERTRUDE C. KOCH,
MARGARET CARNEY.